(12) United States Patent
Troxel

(10) Patent No.: US 10,696,241 B2
(45) Date of Patent: *Jun. 30, 2020

(54) MOBILE VIDEO AND IMAGING SYSTEM

(71) Applicant: Digital Ally, Inc., Lenexa, KS (US)

(72) Inventor: Jason R. Troxel, Lee's Summit, MO (US)

(73) Assignee: Digital Ally, Inc., Lenexa, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 16/372,728

(22) Filed: Apr. 2, 2019

(65) Prior Publication Data

US 2019/0225165 A1 Jul. 25, 2019

Related U.S. Application Data

(63) Continuation of application No. 14/040,006, filed on Sep. 27, 2013, now Pat. No. 10,272,848.

(60) Provisional application No. 61/707,348, filed on Sep. 28, 2012, provisional application No. 61/707,326, filed on Sep. 28, 2012.

(51) Int. Cl.
| | |
|---|---|
| B60R 11/04 | (2006.01) |
| H04N 7/18 | (2006.01) |
| G07C 5/08 | (2006.01) |
| B60R 11/00 | (2006.01) |

(52) U.S. Cl.
CPC ............ *B60R 11/04* (2013.01); *G07C 5/0866* (2013.01); *H04N 7/183* (2013.01); *B60R 2011/0089* (2013.01)

(58) Field of Classification Search
CPC ............ B60R 11/04; B60R 2011/0089; G07C 5/0866; H04N 7/183
See application file for complete search history.

(56) References Cited

U.S. PATENT DOCUMENTS

| | | | | |
|---|---|---|---|---|
| 5,064,157 A | * | 11/1991 | O'Neal | B62K 21/12 248/230.1 |
| 6,783,040 B2 | * | 8/2004 | Batchelor | B62J 9/25 224/413 |
| 6,894,601 B1 | * | 5/2005 | Grunden | G07C 5/006 307/10.2 |
| 7,088,387 B1 | * | 8/2006 | Freeman | H04N 5/772 348/155 |
| 7,350,437 B2 | * | 4/2008 | Mangano | B62K 21/12 74/551.1 |
| 7,353,086 B2 | * | 4/2008 | Ennis | B60R 1/00 701/1 |
| 7,714,704 B1 | * | 5/2010 | Mellen | B62J 99/00 340/425.5 |
| 8,896,694 B2 | * | 11/2014 | O'Donnell | G08B 13/19684 348/143 |

(Continued)

FOREIGN PATENT DOCUMENTS

WO WO-2012037139 A2 * 3/2012 ....... G08B 13/19682

*Primary Examiner* — Richard A Hansell, Jr.
(74) *Attorney, Agent, or Firm* — Erise IP, P.A.

(57) ABSTRACT

An all-weather non-enclosed-vehicle mounted system for recording video and audio. The weatherproof system comprises an interface for connecting various system components and external devices, a display monitor integrated into the same housing as an electronics module operable to receive the video and audio, and a memory operable to receive and store the video and audio.

20 Claims, 6 Drawing Sheets

(56) References Cited

U.S. PATENT DOCUMENTS

| | | | | |
|---|---|---|---|---|
| 2001/0033661 A1* | 10/2001 | Prokoski | H04L 9/3297 | 380/258 |
| 2003/0081121 A1* | 5/2003 | Kirmuss | B60R 11/02 | 348/143 |
| 2003/0081935 A1* | 5/2003 | Kirmuss | H04N 7/18 | 386/327 |
| 2004/0143373 A1* | 7/2004 | Ennis | B62J 99/00 | 701/1 |
| 2005/0050266 A1* | 3/2005 | Haas | G06F 11/1666 | 711/112 |
| 2005/0206741 A1* | 9/2005 | Raber | G07C 5/0891 | 348/211.2 |
| 2006/0055786 A1* | 3/2006 | Ollila | H04N 5/2251 | 348/207.99 |
| 2006/0276200 A1* | 12/2006 | Radhakrishnan | H04L 63/302 | 455/456.1 |
| 2007/0064108 A1* | 3/2007 | Haler | B60R 1/12 | 348/148 |
| 2008/0170130 A1* | 7/2008 | Ollila | H04N 5/2252 | 348/211.99 |
| 2009/0002491 A1* | 1/2009 | Haler | B60R 1/12 | 348/148 |
| 2009/0135007 A1* | 5/2009 | Donovan | G08B 13/19645 | 340/540 |
| 2009/0157255 A1* | 6/2009 | Plante | G06Q 10/00 | 701/33.4 |
| 2009/0189981 A1* | 7/2009 | Siann | H04N 7/183 | 348/143 |
| 2009/0251545 A1* | 10/2009 | Shekarri | G06Q 10/00 | 348/158 |
| 2010/0106707 A1* | 4/2010 | Brown | G06F 16/784 | 707/711 |
| 2010/0123779 A1* | 5/2010 | Snyder | G07C 5/0866 | 348/148 |
| 2010/0194885 A1* | 8/2010 | Plaster | B60R 25/10 | 348/148 |
| 2010/0274816 A1* | 10/2010 | Guzik | G11B 27/034 | 707/802 |
| 2011/0018998 A1* | 1/2011 | Guzik | H04N 21/21 | 348/143 |
| 2011/0187895 A1* | 8/2011 | Cheng | H04N 5/228 | 348/231.2 |
| 2013/0125000 A1* | 5/2013 | Fleischhauer | H04N 21/2743 | 715/723 |

\* cited by examiner

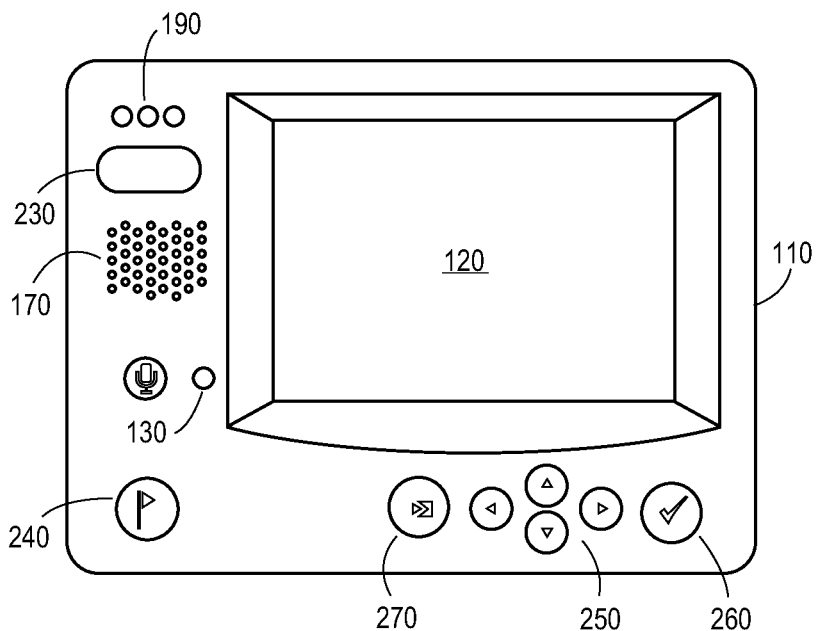
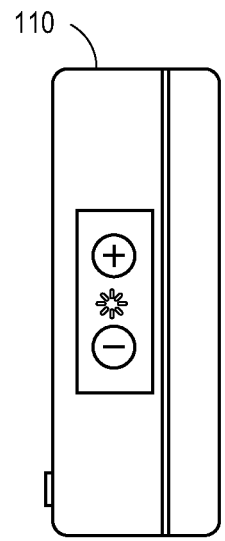
FIG. 5     FIG. 6
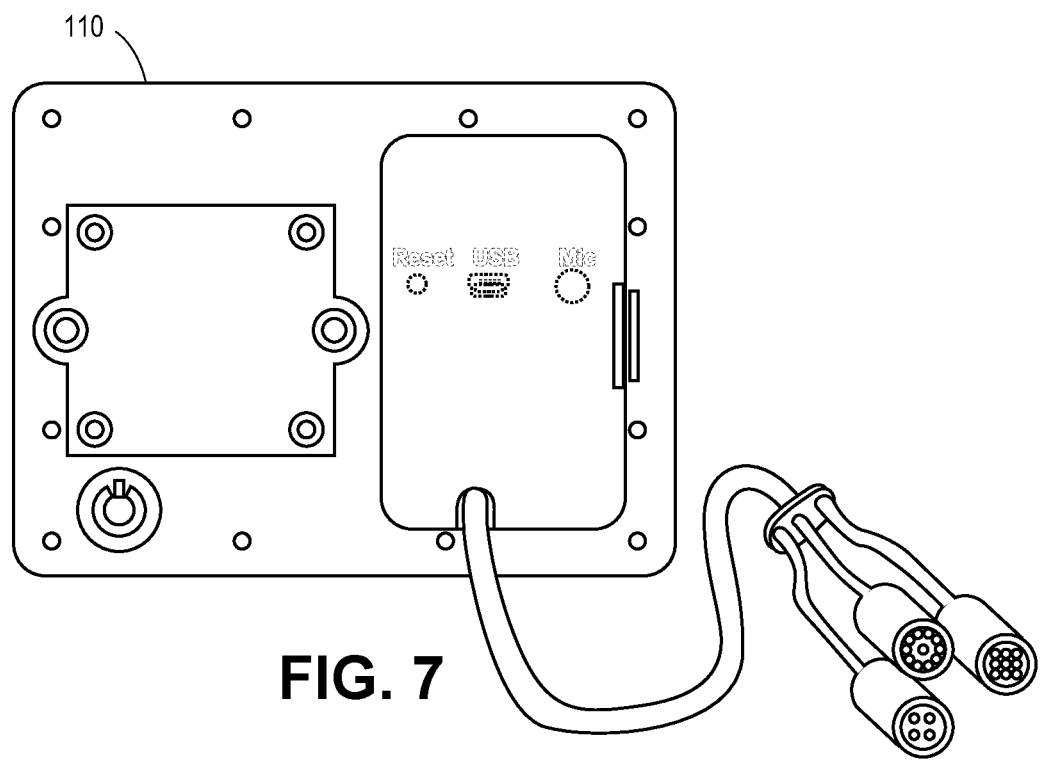
FIG. 7

MOBILE VIDEO AND IMAGING SYSTEM

RELATED APPLICATION

This continuation application claims priority benefit, with regard to all common subject matter, of earlier-filed U.S. patent application Ser. No. 14/040,006, filed Sep. 27, 2013, and entitled "MOBILE VIDEO AND IMAGING SYSTEM;" which claims priority to U.S. Provisional Patent Application No. 61/707,326, filed Sep. 28, 2012, and entitled "MOBILE VIDEO AND IMAGING SYSTEM," and U.S. Provisional Patent Application No. 61/707,348, filed Sep. 28, 2012, and entitled "PORTABLE VIDEO AND IMAGING SYSTEM." The identified earlier-filed provisional patent applications are hereby incorporated by reference in their entirety into the present application.

FIELD

Embodiments of the invention are directed to non-enclosed-vehicle mounted systems for recording video and audio. More particularly, embodiments are directed to a portable, all-weather, non-enclosed-vehicle mounted video systems for use as an evidence gathering tool in a mobile video surveillance system.

BACKGROUND

Many law enforcement vehicles include video systems for recording and displaying activity in and around the vehicle. For alternative forms of non-enclosed motorized vehicles, such as motorcycles, EVs and security carts, ATVs, and boats and other watercraft, the lack of protection from the debris and constant exposure of the elements does not allow for the integration of sophisticated video systems. Moreover, enclosed-vehicle video systems are expensive, bulky, and difficult to operate and maintain. It is also generally difficult to find sufficient space for the camera, recording system, and monitor in enclosed vehicles. In non-enclosed vehicles, finding space for such equipment is even more difficult. In enclosed vehicles, it is possible to store certain components, such as a recording system, in the trunk of the vehicle. However, storing bulky objects in a trunk is not always an option with non-enclosed vehicles. Additionally, many current systems are limited to simply recording and displaying visual images of the activity and do not provide any additional information associated with the activity.

SUMMARY

Embodiments of the invention overcome the above-identified and other problems by providing a portable, all-weather, non-enclosed-vehicle mounted video system, primarily contained within a single weatherproof enclosure that is capable of recording, storing, and replaying video images, and further comprising an interface for connecting external components.

In one embodiment, the video system for the vehicle broadly comprises at least one connector for connecting to an external camera. In another embodiment, the video system broadly comprises at least one connector for connecting to a wireless microphone base station. In various implementations, the video system may allow for capturing audio signals and other desirable information, including, for example, data captured by external components and communicated to the system.

In one embodiment, the video system may comprise various components mounted in or on the console housing, including a video display or monitor, an internal camera, an electronics module, a memory, an internal microphone, a speaker, a plurality of input buttons, one or more LED indicators, input connectors, and output connectors. The system also may include one or more external cameras in communication with the electronics module via a specialized or general purpose connector. One or more additional external components may be connected to the console housing via the input connectors such as, for example, a GPS antenna or a speed detector.

In various implementations, the video system may further include any one or more of the following features. The external or internal video camera may be synchronized with the video system so as to provide an accurate time stamp associated with the video. The video camera may be operable to implement a pre-event recording loop. The video camera and video system may be connected by a high speed bus. There may be one or more video cameras connected to the video system. The system may include a microphone operable to capture and encode audio.

Embodiments of the system may include a portable, mountable housing and the display monitor integrated into the housing. Other embodiments of the system may include a location-determining device operable to determine a location of the vehicle when the video is captured and a recording medium operable to record at least a portion of the captured video and the location of the vehicle when the video was captured.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of embodiments of the invention will be apparent from the following detailed description of the embodiments and the accompanying drawing figures.

BRIEF DESCRIPTION OF THE DRAWING FIGURES

Further features of embodiments of the invention will become apparent to those skilled in the art to which embodiments of the invention relates from reading the following description with reference to the accompanying drawings, in which:

FIG. 5 is a front elevation view of the video system of FIG. 1;

FIG. 6 is a side elevation view of the video system of FIG. 1;

FIG. 7 is a rear elevation view of the video system of FIG. 1; and

DETAILED DESCRIPTION

Figure 1:
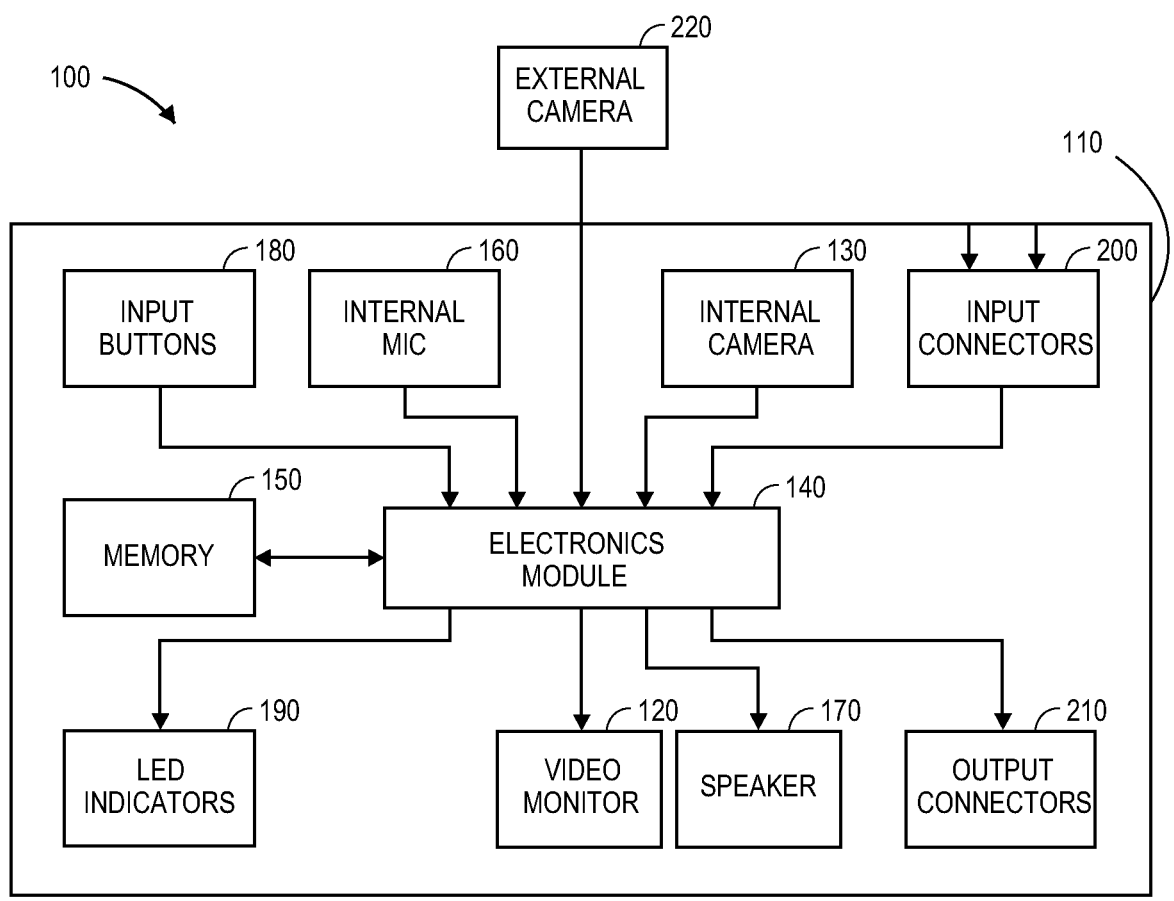
FIG. 1 is a functional block diagram of a video system according to one embodiment of the invention.

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Features and components of embodiments of the invention may be, in some respects, similar to features and components described in U.S. application Ser. No. 14/040,329, filed Sep. 27, 2013, claiming priority to U.S. Provisional Patent Application No. 61/707,348, filed Sep. 28, 2012, and entitled "PORTABLE VIDEO AND IMAGING SYSTEM" (identified above in the Related Applications section), and owned by the assignee of the present application. The referenced non-provisional application filed concurrently herewith and claiming priority to the '348 Provisional Application is incorporated by reference herein in its entirety. Additionally, the following patent and patent application, both of which are owned by the assignee of the present application, are incorporated by reference herein in their entirety: U.S. Pat. No. 8,520,069, issued Aug. 27, 2013, and entitled "VEHICLE-MOUNTED VIDEO SYSTEM WITH DISTRIBUTED PROCESSING; and U.S. patent application Ser. No. 13/967,151, filed Aug. 14, 2013, entitled "COMPUTER PROGRAM, METHOD, AND SYSTEM FOR MANAGING MULTIPLE DATA RECORDING DEVICES."

With reference to the figures, a video system is herein described, shown, and otherwise disclosed in accordance with embodiments of the invention. More specifically, embodiments of the invention provide for a portable, all-weather vehicle-mounted video system that is capable of recording, storing, and replaying video images, wherein the video system includes at least one connector for connecting to an external camera. The video system may include a memory, an electronics module, input buttons, and a display monitor, with all components being integrated into a weatherproof console housing. The video system may also allow for capturing audio signals and other desirable information, including, for example, data captured by external components and communicated to the system.

Referring to FIG. 1, an embodiment of the video system 100 is shown broadly comprising various components mounted in or on the console housing 110, including a video display or monitor 120, an internal camera 130, an electronics module 140, a memory 150, an internal microphone 160, a speaker 170, a plurality of input buttons 180, one or more LED indicators 190, input connectors 200, and output connectors 210. The system 100 also may include one or more external cameras 220 in communication with the electronics module 140 via a specialized or general purpose connector. One or more additional external components (not illustrated) may be connected to the console housing 110 via the input connectors 200 such as, for example, a GPS antenna, a wireless microphone base station, an external triggering event detector, or a speed detector.

In some embodiments, the internal camera 130 may be positioned on the console housing 110 such that it is either forward facing (See FIG. 2) or rear facing. The internal camera 130 may be mounted at an angle, such as approximately between 10 degrees and 90 degrees to the left or to the right, so that the camera is able to properly view an area directly behind or in front of the console even when the console is angled towards the user during normal use, such as where the console is mounted on a vehicle windshield or motorcycle handles and angled toward the user. One appropriate camera for use as the internal camera is a 640.times.480 (VGA) sensor, 0.01 Lux sensitivity, and a 140 degree 4-element coated glass lens.

Figure 3:
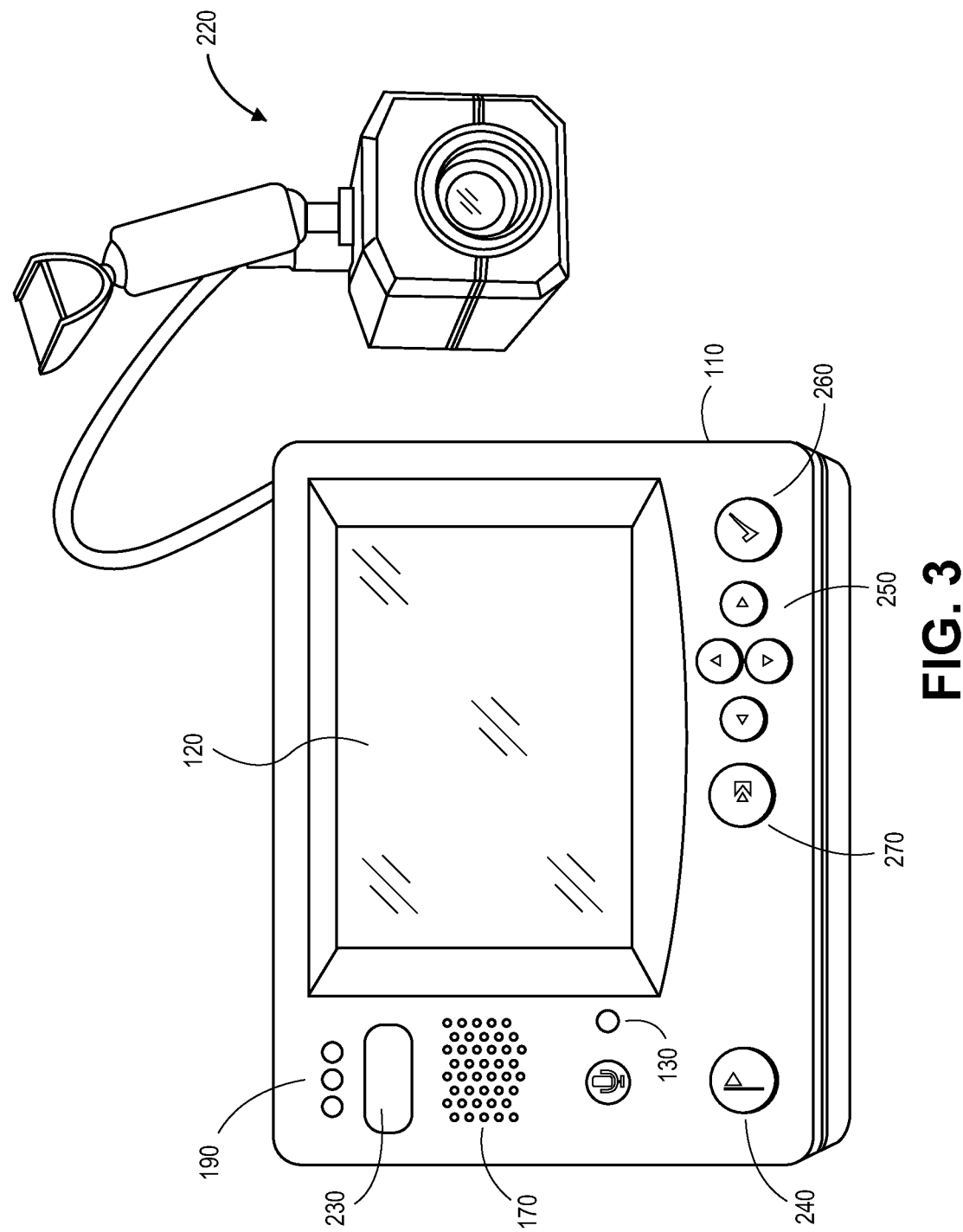
FIG. 3 is a perspective view of a video system constructed according to an embodiment of the invention and illustrating an active monitor showing the image from a forward facing external camera mounted in close proximity.
Figure 4:
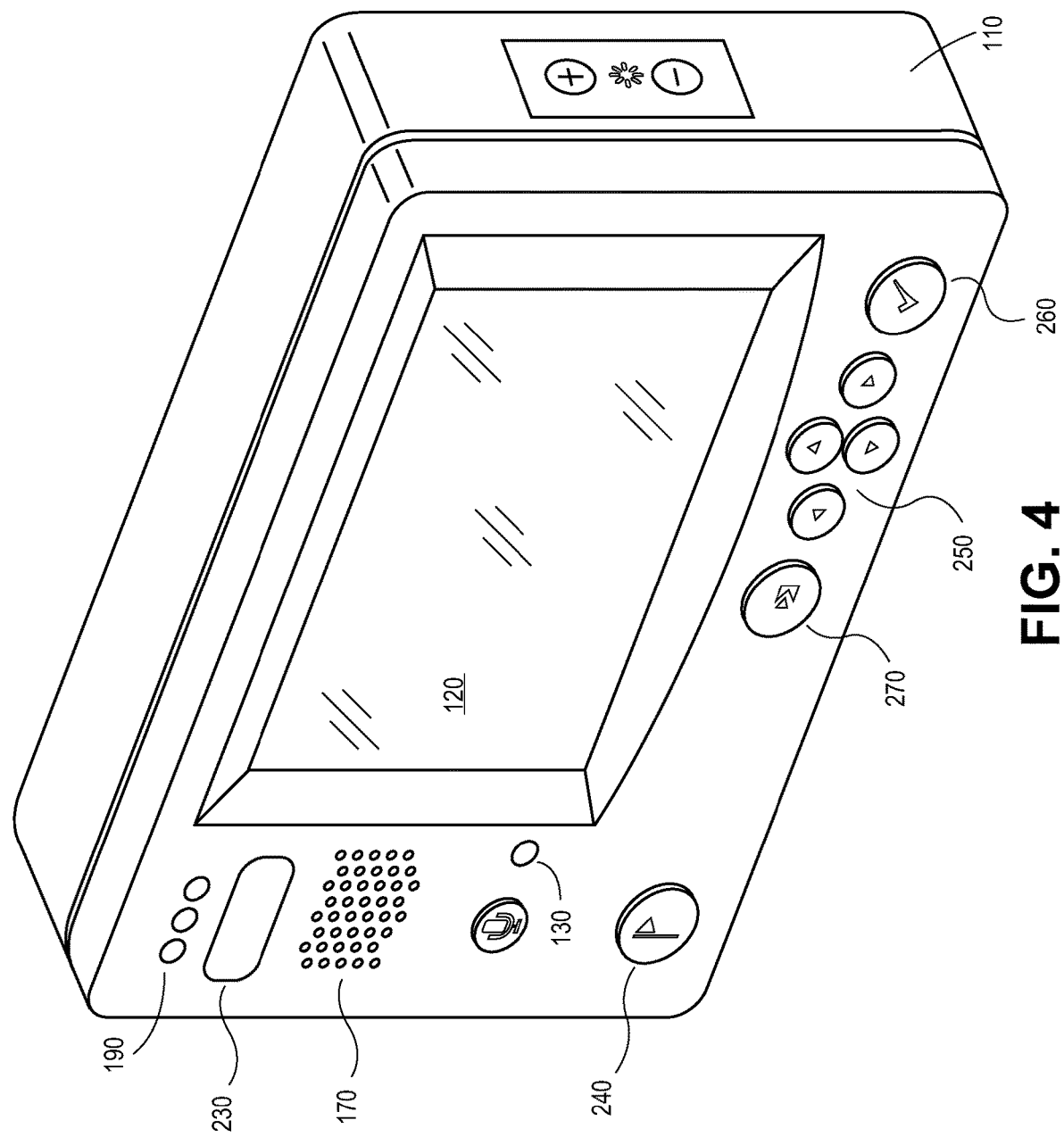
FIG. 4 is a perspective view of the video system of FIG. 1.
Figure 8:
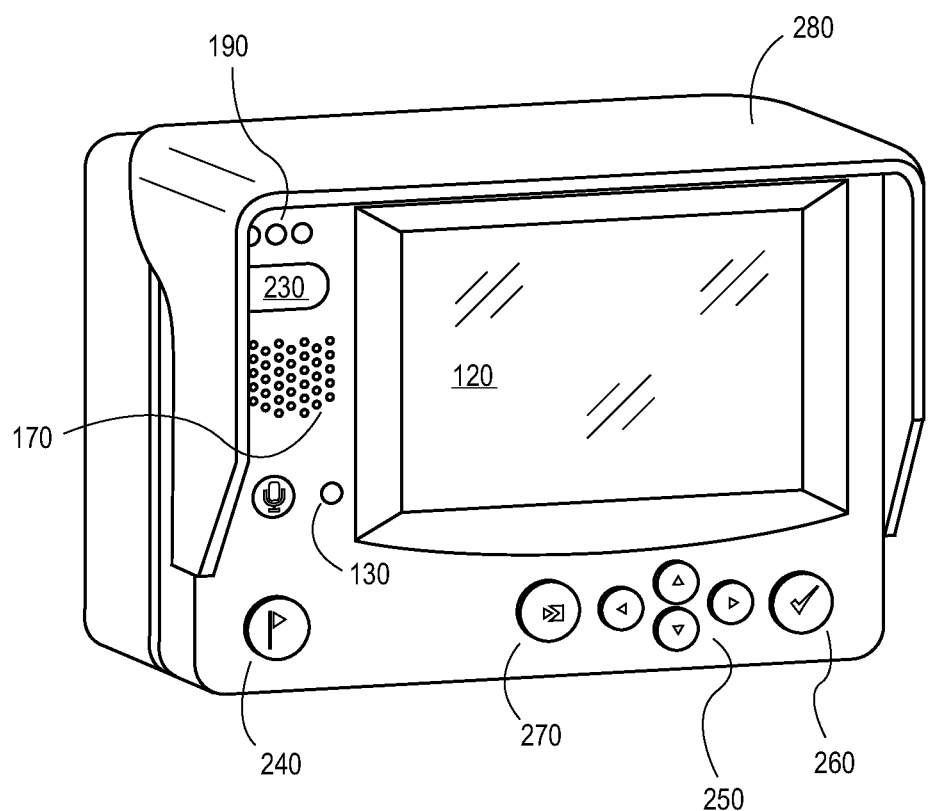
FIG. 8 is a perspective view of a video system constructed according to another embodiment of the invention.

In some embodiments, the external camera 220 is mounted outside of the console housing 110 in a separate enclosure (see FIG. 3). In other embodiments, the external camera 220 is enclosed in a separate weatherproof housing, with weatherproof connections to the console housing 110. One appropriate camera for use as the external camera 220 is a color CCD sensor NTSC with 768.times.484 pixels and 470 lines of resolution, a 10.times. optical zoom and auto focus capabilities, a wide viewing angle that is from 50.7 to 5.4 degrees, and standard and low light modes. In one embodiment, the external camera 220 is mounted near the front wheels of a motorcycle or ATV. In other embodiments, the external camera is mounted near the front forks of the vehicle. In alternative embodiments, the external camera is mounted onto the chassis or non-moving structure rigidly attached to the vehicle. In one embodiment, the external camera 220 may include one or more mounting elements for mounting on a vehicle. Mounting elements may be configured to mount on a vehicle chassis, forks, handlebars, fairings, or other rigidly attached portions of the vehicle. Other embodiments of the mounting elements may comprise grip mounts, ball mounts, suction mounts, fixed mounts, screw mounts, ventilation mounts, brackets, magnets, hinges, or any combination or variation of the elements listed herein. While a single external camera 220 is illustrated in the attached drawing, the invention is not so limited. Multiple external cameras may be used without departing from the scope of the invention.

The display monitor 120 may be mounted or integrated into the console housing 110. Embodiments may provide that the integrated display is sealed, weather proof, or waterproof, so that moisture cannot infiltrate the console housing. In some embodiments, the display monitor 120 may be operable to automatically turn off when the vehicle begins to move or when the vehicle's transmission is shifted into reverse or drive, so that the driver is not distracted while the vehicle is in motion. One appropriate monitor for use as the video monitor 120 is a 3.5 inch diagonal, 640.times.480 TFT LCD monitor. Other embodiments may use a variety of monitor technologies, including high definition, standard definition, color, black and white, touch screen, capacitive screens, plasma displays, LED displays, and other display variations and sizes.

In one embodiment, the electronics module 140 includes a number of electronic components, including components for receiving video signals from the video cameras 130,220 and for transmitting video signals to the monitor 120. In some embodiments, the electronics module 140 also includes components operable to receive and execute instructions stored in internal memory 150. In one embodiment, for example, these instructions include menu instructions for setting operational modes and resolutions. These instructions may be updated by loading instructions into a memory card and then inserting that card into a port in the system 100. Other embodiments may allow for updates of instructions on internal memory or removable memory via wireless connections and/or via one of the input connectors. In various embodiments, the electronics module may include components for manual data entry and system configuration from a user by providing a user interface with input buttons 180 and a graphical user interface displayed on the monitor 120.

In one embodiment, the input and output connectors 200,210 are connected to the module 140 for receiving electronic signals (or "instructions") thereto and transmitting electronic signals (or "instructions") therefrom. In some embodiments, the input and/or output connectors may be in the form of cable pigtails, proprietary ports, RCA ports, stereo ports, USB ports, and other various system interface connectors. The input connectors 200 may include, for example, connectors for the external camera 220, power input, an external microphone, and other accessories. The input connectors 200 may also include one or more connectors for receiving signals to trigger (or "activate") operation of the system. Examples of a triggering event may include, for example, turning on the vehicle's siren and/or signal lights, an accelerometer measurement outside a pre-established norm, a position of the vehicle and/or officer as measured by a GPS, a vehicle crash event or the police vehicle attaining a threshold speed (e.g., 80 m.p.h.), etc. In embodiments, the electronics module 140 may receive a signal from, for example, the vehicle indicative of a triggering event. In response to receipt of the signal, or based on a type of triggering event as evidenced by the signal, the electronics module 140 may begin recording. As an exemplary scenario, the electronics module 140 may receive a signal identifying a triggering event of the police officer being more than twenty feet from the vehicle. Upon receipt of the signal, the electronics module 140 begins recording. Some embodiments may be configured so that an external component, such as a wireless microphone charging cradle, is also operable to detect triggering events and to send the triggering signal to the electronics module 140 for handling. In certain embodiments, a wireless microphone is operable to transmit a triggering event to its charging cradle for the direct transmission of the triggering event to the electronics module 140. It should be appreciated that other types of triggering events and exemplary scenarios can be employed.

The input connectors 200 may also include a port, such as a USB 2.0 or 3.0 port, to allow for directly accessing the memory using a laptop or other computer. In some embodiments, some or all of the input and/or output connectors may be exposed on the housing. Other embodiments may enclose the input and/or output connectors with a housing door or weatherproofing cover. The output connectors 210 may include, for example, an audio/visual connector for transmitting audio/visual signals to an external monitor or recording device. Additionally or alternatively, any one or more of these physical connectors may be replaced with wireless communication technology allowing the system to wirelessly receive or transmit any of the aforementioned input or outputs. Wireless communication technology may operate via communications networks such as Internet, Wi-Fi links, radio-frequency ("RF") links, Bluetooth technology, infrared (IR), Near Field Communication (NFC) technology, or long and short wave radio. In some embodiments, base components associated with wireless communication technology, such as an antenna or wireless card, may be integrated with the electronics module 140 or simply enclosed inside of the housing 110.

In some embodiments, the module 140 may also include components for receiving audio signals from audio sources, such as the internal microphone 160, an external microphone, and for transmitting audio signals to the speaker 170. The module 140 may also include components for receiving wireless signals from one or more remote microphones, such as a wireless microphone worn by a user. In this case, the module may include an integrated 900 MHz (or another suitable frequency allowed by law), spread spectrum, dual receiver capable remote microphone system with a nominal range of up to approximately 1000 feet or greater (a range of several miles may be achieved under the proper conditions). Control signals or triggering events may be also be communicated from a remote microphone to the electronics module, such as a signal to begin video recording. Wireless signals may be transmitted via communications networks such as Internet, Wi-Fi links, radio-frequency ("RF") links, Bluetooth technology, infrared (IR), Near Field Communication (NFC) technology, or long and short wave radio. Embodiments may keep all associated base components for wireless communications enclosed within the housing 110.

In other embodiments, the module 140 may also include an integrated GPS receiver connected to the GPS antenna. Utilizing the information provided by these components, the module 140 may mark recorded video with real-time position data. The system may include a "dead reckoning" function that works with GPS to allow for operation in shielded locations, such as underground garages. Some embodiments may communicate directly with the GPS receiver so that GPS coordinates stored in video event metadata may be automatically updated upon the automatic or manual marking or flagging of a video event.

In one embodiment, the memory 150 is in communication with the electronics module 140 for receiving and storing the video, audio, and other data. One appropriate form of electronic memory for use as the memory is a CF card form factor removable memory module, and one appropriate format for storing the data is MPEG 4 format. Other appropriate forms of electronic memory for use as the memory 150 include micro hard drives, laptop-type hard drives, and flash memory cards. Embodiments of the invention may use a built-in internal solid state memory or a removable form of solid state memory for prevention of data loss due to road vibrations. As will be understood by those in the field, the amount of data storable in the memory is dependent, at least in part, on the resolution utilized by the electronics module 140. It is contemplated, however, that the memory 150 may store approximately one hour of data per gigabyte of memory per simultaneous camera for high resolution, approximately two hours of data per gigabyte of memory per simultaneous camera for medium resolution, and approximately four hours of data per gigabyte of memory per simultaneous camera for low resolution. Other embodiments may allow for a memory redundancy feature, wherein a plurality of memory is used to provide backup or redundancy in data in the event of a memory failure in at least one of the memory modules. Configurations for memory redundancy may entail any combination or plurality of a fixed internal memory, internally stored removable memories, USB flash drives, wireless storage devices, or hard-wired external storage devices.

Referring also to FIGS. 2-8, the input buttons 180 may be mounted or integrated on the console housing 110 and are operable for communicating inputs to the electronics module for controlling various operations, components, and functions of the system 100. In one embodiment, the buttons 180 may include and operate as follows. A record button 230 may trigger recording in one of several recording modes, such as various night and day recording modes. Day and night recording modes may be set automatically using information from an on-board real-time clock or from a light sensor or from the camera 130. One or more visual indicators, such as LEDs 190, on the front and/or the back of the unit may be activated when the system 100 is recording. A flag button 240 may place a bookmark in the video to mark the location of significant events in a video sequence. A series of arrow buttons 250 may scroll through settings such as Video Monitor and Control illumination/indicators ON, Video Monitor OFF, Control illumination/indicators ON, and Video Monitor and Control illumination OFF. A menu button 260 may toggle the menu display on the monitor 120 and turns the monitor ON if the display is OFF. The menu display generally functions as a user interface, wherein a user is capable of configuring various functions of the system 100 by using the input buttons 180. The arrow buttons 250 may allow for scrolling through various functions of the user interface. In some embodiments, a virtual keyboard may be presented to the user and the arrow buttons may allow for the selection of characters to be entered for a particular function. A play button 270 may toggle between play and pause in video playback mode. Other embodiments may provide for a menu display that allows for a secure login, wherein the user is required to enter a PIN or password to access various features of the video system. Another embodiment may provide for a menu display for image and/or video playback. An additional embodiment may provide for a menu display that provides the user with the ability to manually modify (i.e., create, edit, or delete) event metadata on the system display 120 by using the input buttons 180.

Embodiments of the invention may allow for the on-site modification of event metadata for categorizing, labeling, or quantifying details of video events. In one embodiment, the manual on-site modification of event metadata may be facilitated through the use of the integrated input buttons 180 that are operable to communicate inputs to the electronics module 140. The electronics module 140 is operable to modify the metadata related to a particular video event stored in the memory 150. Event metadata may include data fields such as time, date, location, age, event type, ethnicity of involved subject, vehicle identifying information, and other forms of event detail identifying metadata. In some embodiments, event metadata such as time, date, and location may be automatically created by the system 100. For example, a GPS component may automatically send GPS coordinates to the electronics module for creating event metadata when queried by the electronics module by a triggering event, flag/bookmark command, or a current location query. In certain embodiments, automatically entered metadata may not be editable by the user to ensure validity of the forensic information (i.e. video and audio) captured by the system. Other forms of event metadata may be easily created or modified by the user when categorized by metadata type, for example, event type, event ethnicity, event age, and other event identifying descriptors. Other embodiments may further break down metadata categories by listing detailed descriptors within the metadata categories. In a non-limiting example, an event type category may be sub-categorized by a law enforcement officer as a "traffic stop", "DUI", "accident", or "pursuit". In this non-limiting example, the law enforcement officer can categorize his/her videos "on site" or "in the field" for facilitating the organization of multiple video events. Even further embodiments may allow for the manual text entry of metadata by selecting characters with the input buttons 180 to navigate a virtual keyboard displayed to the user. As used herein, input or inputs may be the press of a button or key, virtual button (including invisible or hidden virtual buttons), a swipe, gesture, motion, sound, spoken word, or any combination or plurality of the above inputs.

Figure 2:
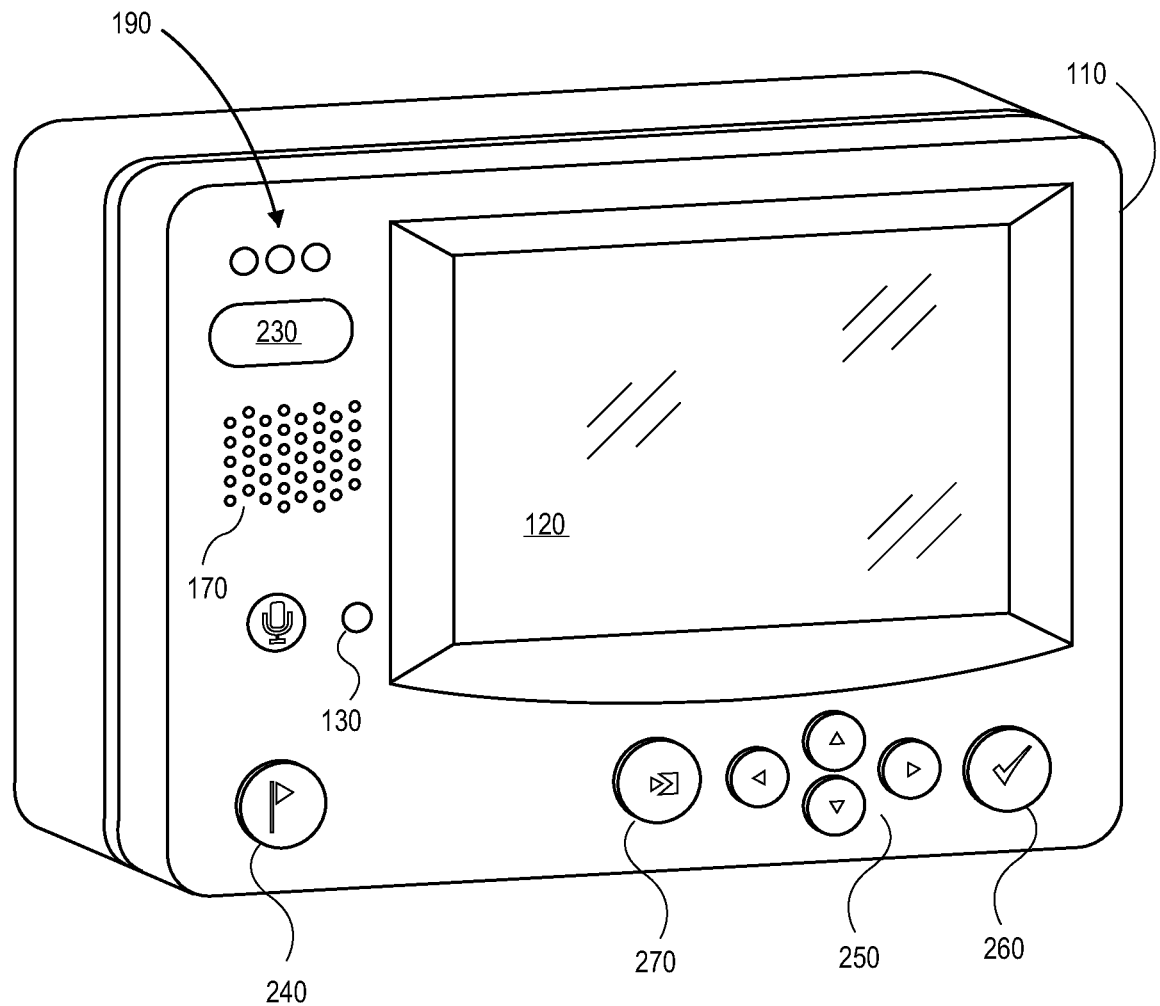
FIG. 2 is a perspective view of a video system constructed according to one embodiment of the invention.

An exemplary console is illustrated in FIG. 2. In one embodiment, the console 110 is relatively small and lightweight. By way of example, the console 110 is between five inches and ten inches wide, between three inches and five inches tall, and between once-half inch and two inches thick. In one embodiment, the console 110 is weatherproof, including waterproof, such that it may be used in situations where it is exposed to moisture and other elements. Embodiments of the console would be weatherproof, including weatherproofing the input buttons, display, speaker, LED indicators, internal microphone, and internal camera. In other embodiments, the external camera, external components, and the connections to the console would be weatherproof as well. Further embodiments may include weatherproof plugs or covers for unused input and output connectors. Other embodiments may provide for a detachable or a fixed sun shield 280 to assist in glare prevention. (See FIG. 8).

In some embodiments, the system 100 may include one or more mounting elements for mounting the console 110 on a vehicle in such a way that movement and vibrations from the vehicle do not cause unintentional movement of the console 110. Such mounting elements may be configured to mount the console 110 on a vehicle windshield, on a motorcycle or ATV handlebar, on a boat or on another vehicle component. In one embodiment, the mounting element comprises a handle bar mount and a ball-hinge element configured for intentional adjustments. Other embodiments of the mounting elements may comprise grip mounts, ball mounts, suction mounts, fixed mounts, screw mounts, ventilation mounts, brackets, magnets, hinges, or any combination or variation of the elements listed herein.

In one embodiment, power is supplied to the components of the video system 100 from the vehicle. Some embodiments may have a weatherproofed power button exposed on the housing. The power provided is heavily filtered and regulated to avoid interference. The video system, using the particular components described herein, may require 4 amps from a 10 V to 24 V DC power supply. The video system 110 may include a cable that is configured to plug into the power input connector of the console housing and into a standard vehicle power jack, such as a "cigarette lighter" type power jack. It should be noted that the illustrated embodiment of the invention does not include an internal power source. However, some embodiments of the system 110 may include an internal power source, such as a battery. Additionally, the system 100 may be provided with a "stealth" mode in which the camera 130,220 and the microphone 160 are active and recording, but the lights and indicators 190, such as the one or more LEDs 190, are turned off, thereby making the system 100 appear to be dormant. Furthermore, the system 100 may provide "pre-event" recording in which the system 100 records constantly in a loop of a selected duration of time, such as thirty seconds or sixty seconds, so that when an event triggers recording, the events occurring shortly prior to the initiation of recording are also recorded and stored.

Various embodiments of the system 100 include any one or more of the following features: required entry of a password or code prior to accessing and changing operational settings; required use of a key to unlock a lockable housing 110 for removal of any removable memory components; incorporation of electronic watermarks into the recorded video images to prevent tampering or alteration; wireless downloading of the contents of the memory to a laptop or other computer; streaming the live video from the camera and possibly other inputs and/or outputs via a high-speed wireless data network; encoding of multiple video streams from four or more cameras simultaneously; a remote control device for allowing a user to remotely control the operation of the system 100; a temperature sensor and temperature indicator operable to detect and warn the user if the system 100 is at risk of malfunction or damage due to an ambient temperature that is too high or too low for proper operation, such as may easily occur in a vehicle on a very hot or very cold day. The console housing 110, and possibly the housings of other components of the system 100, may be vented to dissipate heat, and may include other passive or active features to moderate temperature, especially in relatively extreme environments.

Although various exemplary data formats and data transfer protocols are identified above, it is contemplated that any suitable format or protocol, whether now existing or hereafter developed, may be used in conjunction with embodiments of the invention. The discussion of specific formats or protocols herein is not intended to limit the scope of the invention. For example, although the MPEG-4 format is mentioned above for encoding and storing audiovisual data obtained by the system, it is contemplated that other formats such as, for example, H.263 and H.264, may also be used. Likewise, audiovisual data may be stored in high-definition (HD) format. Hardware or software changes or upgrades may be required in order to change formats, however the inventive functionality of the system, as described herein, is preserved regardless of the specific format used. Law enforcement's implementations of the system are generally used to produce an evidentiary record, therefore one embodiment may incorporate a lossless format.

In addition to various suitable formats that may be used in conjunction with embodiments of the system 100, it is contemplated that any suitable data transfer protocol may be used. For example, real-time streaming protocol (RTSP) may be used to transfer data in the system 100 providing that the system 100 is adapted to recover any lost frames from the camera 130,220. User datagram protocol (UDP) provides a better, lossless protocol for use with the system 100. Any suitable existing protocol may be used, and new protocols may be developed for use with the system 100. Because implementations of the system 100 include a data storage function in the camera 130,220, as described above, for retrieval of frames lost during data transfer, it is contemplated that typical IP cameras having such a storage feature may be used, with the system 100 ensuring that lost frames are faithfully transmitted to the electronics module 140 when requested therefrom.

As noted above, embodiments of the system 100 may be used with a variety of software, audiovisual formats, data transfer protocols, and the like. In some instances, changes to formats or protocols, or even making hardware changes such as upgrading the system to a HD-capable camera, may require that the software of the system 100 be updated. In some implementations of the system 100, it is contemplated that the system software will be capable of being upgraded in the field. In such implementations, software upgrades may be provided via a memory card, portable flash memory device, a wireless data link to a portable device, a wireless internet data link, or any other suitable device or method for upgrading the system software in the field. In some implementations wherein wireless communications are used for system upgrades, it is contemplated that embodiments of the system may optionally include a wireless communications component adapted to connect to a remote source for obtaining updates automatically. Such communications could, for example, be carried out over the internet via a cellular communications signal that allows embodiments of the system to access the internet. Other embodiments could utilize wireless technologies such as WiFi, Bluetooth, Near Field Communications, radio frequency (RF), or infrared (IR) to communicate with a computing device operable to send software upgrades to embodiments of the system 100.

Embodiments of the invention may also comprise one or more computer programs stored in or on computer-readable medium residing on or accessible by the electronics module 140. The computer programs may comprise listings of executable instructions for implementing logic functions and can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory medium that can contain, store, or communicate the programs. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disc read-only memory (CDROM).

The video system 100 can be allowed to upload recordings to an external server or computing device. The external server or computing device could be a computing device housed in the vehicle or could be a centralized computing device, such as housed at a police precinct. Multiple Wi-Fi authorized upload times can be set, which denote when multiple video systems are allowed to upload data. Ideally, upload times will be set during non-use times such as shift changes, lunch breaks, and off duty times. Alternatively, uploading of recorded data can occur whenever the recording devices are within a predetermined distance from the external server or computing device, such as when the officer is located in the vehicle or, preferable, when the officer's vehicle is located near the police precinct. Upload settings can be changed as well.

In addition to what has been described above, various peripheral devices may be utilized in conjunction with embodiments of the invention. In law enforcement implementations of the system 100, for example, or in other implementations where security is important, the system 100 may be provided with a biometric identification component or other secure identification component. In an implementation of the system 100 requiring biometric identification, for example, a fingerprint may be required before a user of the system 100 can log into the system 100 and begin to use the system 100. Other security peripherals include, for example, a dongle carried by a user of the system 100 that can be presented to the system 100 in order to verify the identity of a user. Any suitable security component or method may be included with embodiments of the invention.

In addition to maintaining or verifying user security, embodiments of the system 100 may also include additional components to establish the security and evidentiary value of the audiovisual data recorded thereby. For example, it is contemplated that the camera 130,220 associated with the embodiments of the system 100 include a unique identifier, such as a serial number or other identifier that is unalterable, and that audiovisual signals obtained by any given camera are stamped with that camera's identifier. Thus, the identity of the camera that acquired any given data is verified and secured along with the actual data recorded by the system 100.

Peripheral devices used for interfacing with the embodiments of the system 100 may also be provided. For example, a keyboard may be provided, the keyboard adapted to plug directly into embodiments of the system 100 or to communicate wirelessly with embodiments of the system 100 via Bluetooth, infrared, or other suitable method of wireless communication. Further, it is contemplated that a PDA, laptop, smartphone, or other mobile device may be adapted (for example by installing software thereon) for communication with and manipulation of embodiments of the system 100. Such devices may be used to manipulate a display associated with embodiments of the system 100, or to configure or control embodiments of the system 100.

With respect to any of the various peripherals that may be associated with embodiments of the system 100, whether described herein or not, it is contemplated that the peripherals may be plugged into or otherwise associated with electronics module 140 or that any of cameras 130,220 may be adapted to communicate with the peripherals, either through a hard-wired or wireless connection.

Although the invention has been disclosed with reference to various particular embodiments, it is understood that equivalents may be employed and substitutions made herein without departing from the contemplated scope of the invention. For example, specific suitable hardware, processors, software, and the like as described above is exemplary and not intended to limit embodiments of the invention. Any suitable hardware may be used to implement the inventive functionality of embodiments of the system.

The invention claimed is:

1. A video system for a law-enforcement vehicle, comprising:
   a housing configured to be mounted to a law-enforcement vehicle;
   an electronics module enclosed in the housing;
   a plurality of video cameras communicatively coupled to the electronics module;
   wherein each camera is operable to capture video and automatically stamp the video with a unique camera identifier uniquely identifying the camera;
   a display monitor integrated into the housing,
   wherein the integrated display monitor is configured to selectively present a user interface to a law enforcement officer,
   wherein the user interface displays recorded video and event metadata comprising an event descriptor describing law enforcement activity recorded in the video,
   wherein the event descriptor is selected from the set consisting of event type, subject ethnicity, subject age, and vehicle identifying information;
   wherein the video system is adapted to communicate wirelessly with an external computing device, and
   wherein the external computing device is configured to manipulate the display monitor.

2. The video system of claim 1, wherein the video system is operable to implement a pre-event recording loop.

3. The video system of claim 1, where at least one video camera of the plurality of video cameras is integrated into the housing.

4. The video system of claim 1, wherein the external computing device is a laptop.

5. The video system of claim 1, wherein the external computing device is a smartphone.

6. The video system of claim 1, wherein the law-enforcement vehicle is a motorcycle.

7. The video system of claim 1, further comprising a biometric identification component.

8. The video system of claim 1, wherein the video system is adapted to stream video data over the Internet in real time over a wireless data link.

9. The video system of claim 8, wherein the wireless data link is a cellular communications signal.

10. The video system of claim 1, wherein the video system is adapted to store video data to a solid-state memory.

11. A video system for a law-enforcement vehicle, comprising:
    a display monitor;
    an electronics module;
    a microphone communicatively coupled to the electronics module;
    a video camera communicatively coupled to the electronics module,
    wherein the camera is operable to capture video and automatically stamp the video with a unique camera identifier uniquely identifying the camera;
    wherein the integrated display monitor is configured to selectively present a user interface to a law enforcement officer,
    wherein the user interface displays recorded video and event metadata comprising an event descriptor describing law enforcement activity recorded in the video,
    wherein the event descriptor is selected from the set consisting of event type, subject ethnicity, subject age, and vehicle identifying information;
    wherein the video system is adapted to communicate wirelessly with an external computing device, and
    wherein the external computing device is configured to control the video system.

12. The video system of claim 11, wherein the video system is operable to implement a pre-event recording loop.

13. The video system of claim 11, comprising an additional video camera operable to capture additional video and automatically stamp the additional video with a different unique camera identifier.

14. The video system of claim 11, wherein the external computing device is a laptop.

15. The video system of claim 11, wherein the external computing device is a smartphone.

16. The video system of claim 11, wherein the law-enforcement vehicle is a motorcycle.

17. The video system of claim 11, further comprising a biometric identification component.

18. The video system of claim 11, wherein the video system is adapted to stream video data over the Internet in real time over a wireless data link.

19. The video system of claim 18, wherein the wireless data link is a cellular communications signal.

20. The video system of claim 11, wherein the video system is adapted to store video data to a solid-state memory.

* * * * *